3,126,426
BUTANE DEHYDROGENATION
Byron W. Turnquest, Chicago, and William P. Hettinger, Jr., Dolton, Ill., assignors, by mesne assignments, to Sinclair Research, Inc., New York, N.Y., a corporation of Delaware
No Drawing. Filed May 11, 1960, Ser. No. 28,240
3 Claims. (Cl. 260—683.3)

This invention relates to the dehydrogenation of hydrocarbons and more particularly to the dehydrogenation of paraffins in the presence of novel dehydrogenation catalysts.

Previous attempts to use metals such as platinum on a suitable support such as alumina for the dehydrogenation of paraffins have proved unsatisfactory because of the large number of side reactions produced and the instability of the catalyst. Moreover, during the dehydrogenation reaction the catalyst becomes depreciated in activity or selectivity for the required reaction for there is deposited on the catalyst a carbonaceous or hydrocarbonaceous material called "coke." Consequently, the catalyst must be subjected quite often to a regeneration treatment after relatively short periods of operation.

It has now been discovered that paraffins can be dehydrogenated in the presence of certain catalysts of exceptionally high selectivity and low coke laydown characteristics to obtain desired products. In accordance with the present invention, the paraffin to be dehydrogenated is contacted under dehydrogenation conditions with a catalyst consisting essentially of a minor catalytic amount, for instance about .01 to 5% by weight of a platinum group metal, such as platinum, rhodium, palladium, iridium or mixtures thereof, preferably about 0.1 to 1.5%; and about 1 to 20% by weight of a 3-55 atomic number alkali metal, preferably about 3 to 10% advantageously over 5%, on an essentially alumina base. Usually the catalyst has about 75 to 99% or more by weight of alumina.

The vapor phase dehydrogenation process of the present invention is conducted under an elevated temperature, for instance, about 900 to 1200° F., preferably about 950 to 1100° F. If molecular hydrogen is added the hydrogen to hydrocarbon ratio is preferably in the range of about 1:1 to 5:1, although ratios as high as about 10:1 or more may be employed. The pressure may vary from about 50 mm. of Hg to about 5 atmospheres but a pressure not materially exceeding atmospheric pressure is preferred in the absence of added hydrogen while in the presence of hydrogen the pressure advantageously ranges from about 0.5 atmosphere to 5 atmospheres, preferably about 1 to 2 atmospheres. The contact time or weight hourly space velocity will be dependent on the catalyst, temperature and pressure employed but will generally range from about 0.1 to 10 or more, preferably about 0.5 to 5 WHSV (weight of hydrocarbon per weight of catalyst per hour).

The feed of the present invention can be any dehydrogenatable paraffinic hydrocarbon, advantageously of 2 to 20 carbon atoms. The preferred paraffin feed would be branched chain, straight chain or cyclic paraffins, in the $C_4$ to $C_7$ range which undergo dehydrogenation to yield olefins, dienes or aromatics. Substantially pure normal paraffins are especially advantageous feeds.

The novel dehydrogenation catalysts of the present invention can be made, for instance, by impregnating or providing activated alumina or an alumina hydrate with a platinum metal component and a lithium, potassium, sodium, cesium or rubidium compound; and then calcining the resulting composition. Alternatively, the catalyst can be prepared by forming a composition of alumina, a platinum metal-providing compound, and a potassium, sodium, cesium and rubidium oxide; and then calcining the resulting composition. A convenient manner in which the catalyst of the present invention can be made is by first preparing a platinum-alumina catalyst according to known methods in the art including calcination and then adding the alkali metal oxide or oxide precursor (under calcination conditions) and again calcining. Thus it is seen that the preparation may involve several calcinations and in any event the composition containing the platinum metal, alkali metal and alumina is always calcined. Preferred impregnating potassium, sodium, cesium and rubidium compounds are those that decompose during calcination to give most likely the corresponding metal aluminate after intermediate oxide formation as, for example, the alcoholates, chelates, hydroxides, carbonates, bicarbonates, etc. The preferred alkali metal compounds are the salts of weak acids such as the carbonates. Calcination temperatures are those known in the art, for example, about 600 to 1300° F. or more. The catalysts can be regenerated through removing carbonaceous materials deposited during dehydrogenation by contact with an oxygen-containing gas, preferably while controlling the amount of oxygen to prevent temperatures in substantial excess of about 1000° F. A combination of the alkali metals of the present invention can be used and the catalyst can contain as well various quantities of other alkali and alkaline metals; however, other catalytic promoting metals need not be employed.

The alumina employed as the carrier or support for the catalyst of the present invention can be any of the variety of available activated aluminas or alumina hydrates. A very suitable alumina support for the catalyst of this invention is an activated alumina produced by calcining an alumina hydrate obtained by spray drying an aqueous slurry of alumina hydrate containing trihydrate to form microspherical particles containing up to about 20% of free water. Other desirable aluminas are described in U.S. Patents Nos. 2,838,444 and 2,838,445 to Teter, Gring and Keith. Briefly, these aluminas are characterized by large pore and are essentially composed of a mixture of gamma-alumina modifications corresponding to a mixture of precursor alumina phases in which crystalline trihydrate predominates. The most suitable aluminas for use in the present invention are found to be those having a high surface area, for instance, alumina having a surface area of at least about 100 or 200 m.$^2$/gm.

Known methods for adding the metal components to the alumina support can be used. For example, the platinum metal component can be added to the alumina, for instance, through reaction with a halogen platinum acid such as fluoro-, chloro-, bromo- or iodoplatinic acid, and hydrogen sulfide in an aqueous slurry of the alumina. Alternatively, the platinum component can be provided by mixing an aqueous platinum sulfide sol with the alumina. This sol can be made by reaction in an aqueous medium of a halogen platinic acid with hydrogen sulfide. The alumina containing the platinum metal can be dried and calcined usually at a temperature above about 600° F., e.g. up to about 1200° F. or 1300° F. or more. The prepared platinum-alumina catalyst can then be soaked in an aqueous solution of the desired water-soluble potassium, sodium, cesium or rubidium compound which is then converted to the corresponding metal aluminate, for instance, by again drying and calcining at temperatures above about 600° F., e.g. up to about 1200° F. or 1300° F. or more. The quantity of alkali metal impregnating compound required to produce the most effective dehydrogenation catalyst depends on the metal selected, the amount of platinum metal deposited and to some extent upon the support.

The following examples are included to further illustrate the invention. In the examples, the reactions were run in a micro-reactor using a catalyst charge of about 5 to 10 grams.

EXAMPLE I

A platinum-potassium-alumina catalyst designated catalyst B was prepared as follows:

20 grams of $KHCO_3$ were dissolved in deionized water to make 88 ml. of solution. This solution was poured over 110 g. of a calcined platinum-alumina catalyst (0.6% $Pt/Al_2O_3$) of U.S. Patent 2,838,444, while the catalyst was being stirred. The catalyst was dried at 110° C. in a forced-air drying oven and was stirred several times during the initial stages of drying. After drying about 18 hours the catalyst was placed in a muffle furnace and calcined 3 hours at 500° F., followed by 3 hours at 900° F. The catalyst was removed from the furnace after this treatment and cooled in a desiccator. Analysis: 2.42% volatile matter at 1000° C., 7% K by flame photometer.

The catalyst was brought up to operating conditions in flowing atmospheric hydrogen. Pure grade normal butane (99+ mole percent) was passed over the above catalyst at a temperature of 1000° F., a pressure of 1 atmosphere, a $H_2$ to hydrocarbon ratio of 3.8 and a WHSV of 0.47. For comparative purpose pure grade normal butane was also passed under similar condition over the platinum-alumina catalyst A untreated with the potassium salt. The results are shown in Table I below:

TABLE I

| Catalyst | A | | B | |
|---|---|---|---|---|
| Percent Pt | 0.6 | | 0.6 | |
| Percent $Al_2O_3$ | 99.4 | | 92.4 | |
| Percent K | 0 | | 7.0 | |
| Min. on stream | 15 | 60 | 15 | 75 |
| Selectivity to butenes, mol. percent | 1.4 | 10.0 | 79.2 | 77.5 |
| Butane conv. mol. percent | 92 | 74 | 26.2 | 27.5 |
| Butene yield, mol. percent | 1.3 | 7.4 | 20.8 | 21.3 |
| Percent Coke (wt.) | 1.7 | | ~0 | |

As can be seen by the data of Table I, the alkali metal treated catalyst is much superior to the untreated catalyst for butene formation. In addition, there is little aging of the treated catalyst as well as low coke laydown.

EXAMPLE II

A platinum-sodium-alumina catalyst was prepared according to the general procedure of Example I and analyzed 0.6% Pt, 98.4% alumina and 1% sodium.

Pure grade normal butane was passed over the prereduced catalyst at a temperature of 1000° F., a pressure of 1 atmosphere, a $H_2$ to hydrocarbon ratio of 4.5:1 and a WHSV of 1.2. Again for comparative purpose n-butane was passed under similar conditions over the platinum-alumina catalyst untreated with the sodium salt. The results are shown in Table II.

TABLE II

[Feedstock—n-butane; conditions: 1000° F., 1 atm., $H_2$/hydrocarbon=4.5/1, WHSV=1.2]

| Catalyst | A | | C | |
|---|---|---|---|---|
| Percent Pt | 0.6 | | 0.6 | |
| Percent $Al_2O_3$ | 99.4 | | 98.4 | |
| Percent Na | | | 1.0 | |
| Min. on stream | 15 | 30 | 15 | 60 |
| Selectivity to butenes, mol. percent | 4.2 | 11.4 | 52.0 | 52.5 |
| Butane conv., mol. percent | 91.0 | 83 | 36.4 | 45.2 |
| Butene yield, mol. percent | 3.8 | 9.5 | 19.0 | 23.7 |
| Percent Coke (wt.) | 1.2 | | 0.24 | |

The data in this table shows that sodium is an effective metal for improving the selectivity of platinum-alumina catalysts toward butenes, although in the amount of 1% it is not as effective as 7% potassium. The data also shows that coke deposit is substantially less even when the alkali metal is as low as 1% by weight.

EXAMPLE III

Catalyst Preparation 100 grams of platinum group metal-alumina composition of the type described in U.S. Patent 2,838,444 and containing 0.6 weight percent Pt was heated at 400° F. in a vacuum. Evacuation was continued for approximately one-half hour and the composition was then cooled to room temperature. 12.6 grams of KOH was added to 150 ml. of distilled water and the resulting solution was run into the evacuated flask where it saturated the catalyst. After standing for one-half hour, 86 ml. of KOH solution was decanted off, and the catalyst was then dried at 300° F. in a forced draft oven for approximately 48 hours. The resulting dried catalyst contained 4.86 weight percent potassium.

The catalyst thus prepared, designated catalyst D, was charged to a reactor and its performance was determined at dehydrogenation conditions using n-nonane and bench scale equipment. Conditions of operation were 925° F., 200 p.s.i.g. and 2.6 weight hourly space velocity. The catalyst was brought up to operating conditions in flowing atmospheric hydrogen and performance was then determined by passing hydrogen and commercially pure grade n-nonane, dried prior to use with alumina, over the catalyst. For purpose of comparison tests were also made under similar conditions using the platinum metal-alumina composition, designated catalyst A. The results are set out in Table III.

TABLE III

[Conditions: 925° F., 200 p.s.i.g., 2.6 WHSV, 5 $H_2$/hydrocarbon]

| Catalyst | A | D |
|---|---|---|
| Percent Pt | 0.6 | 0.6 |
| Percent $Al_2O_3$ | 99.4 | 94.54 |
| Percent K | 0 | 4.86 |
| Yield, Wt. Percent: | | |
| $H_2$ | 4.0 | −0.3 |
| $C_1$ | 2.0 | 0.4 |
| $C_2=$ | 0.0 | 0.3 |
| $C_2$ | 4.5 | 2.2 |
| $C_3=$ | 0.3 | 0.2 |
| $C_3$ | 5.7 | 3.3 |
| $iC_4$ | 1.7 | 0.0 |
| $nC_4$ | 4.9 | 2.4 |
| $tC_4=$ | 0.4 | 0.0 |
| $iC_5$ | 3.6 | 0.1 |
| $nC_5$ | 2.5 | 1.1 |
| $tC_5=$ | 0.2 | 0.0 |
| $C_6+$ | 70.2 | 90.3 |
| Total | 100.0 | 100.0 |
| $C_5+$ Vol. Percent | 67.0 | 90.2 |
| RON | 99.0 | 6.0 |
| °API | 41.0 | 64.1 |
| Br Number | 1.8 | 8.8 |
| Paraffins | 24.5 | 92.0 |
| Olefins | 1.2 | 6.8 |
| Naphthenes | 0.0 | 0.0 |
| Aromatics | 74.3 | 1.2 |
| F.F. Vol. Percent Aromatics | 49.8 | 1.1 |
| F.F. Vol. Percent $C_5+$ Olefins | 1.2 | 6.1 |
| Selectivity: Vol. Percent olefins/100-Vol. Percent $C_5+$ | 0.036 | 0.675 |
| Percent Carbon on Catalyst | 1.38 | 0.32 |

The data of Table III demonstrate the selectivity of the catalyst of the invention for dehydrogenation. Hydrocracking and isomerization were very low. The RON of 6 indicates that little or no isomerization occurred. Table III also shows that with the catalyst of the invention carbon laydown was almost eliminated.

We claim:

1. A method for the dehydrogenation of butane to selective yields of butene which comprises contacting the butane in the presence of added hydrogen at a temperature of about 900 to 1200° F. with a calcined catalyst consisting essentially of a minor catalytic amount of a platinum metal and over 5 up to 20% of a 3 to 55 atomic number alkali metal on an essentially alumina base.

2. The method of claim 1 wherein the catalyst includes about 0.1 to 1.5% of platinum and over 5 up to 10% of the 3 to 55 atomic number alkali metal.

3. The method of claim 2 wherein the alkali metal is potassium.

References Cited in the file of this patent

UNITED STATES PATENTS

| | | |
|---|---|---|
| 2,479,110 | Haensel | Aug. 16, 1949 |
| 2,651,598 | Ciapetta | Sept. 8, 1953 |
| 2,972,644 | Holmes et al. | Feb. 21, 1961 |
| 2,987,560 | Holmes et al. | June 6, 1961 |